United States Patent Office

3,450,055
Patented June 17, 1969

3,450,055
FLUID PROPORTIONING DEVICES
Alan Gordon England, Birmingham, England, assignor to Joseph Lucas (Industries) Limited, Birmingham, England
Filed June 21, 1967, Ser. No. 647,676
Claims priority, application Great Britain, June 24, 1966, 28,403/66
Int. Cl. F04b *17/00, 17/04, 21/00*
U.S. Cl. 103—51                                1 Claim

ABSTRACT OF THE DISCLOSURE

A fluid proportioning device comprising a body part in which is defined a stepped bore having a central portion and two subsidiary portions of reduced diameter, and a complementary piston assembly, slidable in the bore, inlet and outlets to the subsidiary portions of the bore, connectors through which fluid can flow to the ends of the central portion of the bore, sealing means located in the smaller portions of the bore for co-operation with the piston assembly and sealing means located in the central portion of the bore for co-operation with the piston assembly, movement of the piston assembly serving to displace from one of the subsidiary bores a quantity of fluid and from the central portion of the bore a larger quantity of fluid.

---

This invention relates to a fluid proportioning device and has for its object to provide such a device in a simple and convenient form.

A fluid proportioning device in accordance with the invention comprises in combination, a first pumping chamber having a movable wall, a second pumping chamber having a movable wall, and means interconnecting the movable walls of the first and second pumping chambers so that they can be moved by the same amount, and the arrangement being such that in use, the two chambers are filled with two fluids respectively which it is desired to proportion and then said means is operated to discharge the fluids from the chambers, the ratio of the volumes of the fluids displaced from the chambers being determined by the ratio of the areas of the movable walls.

Figure 1:
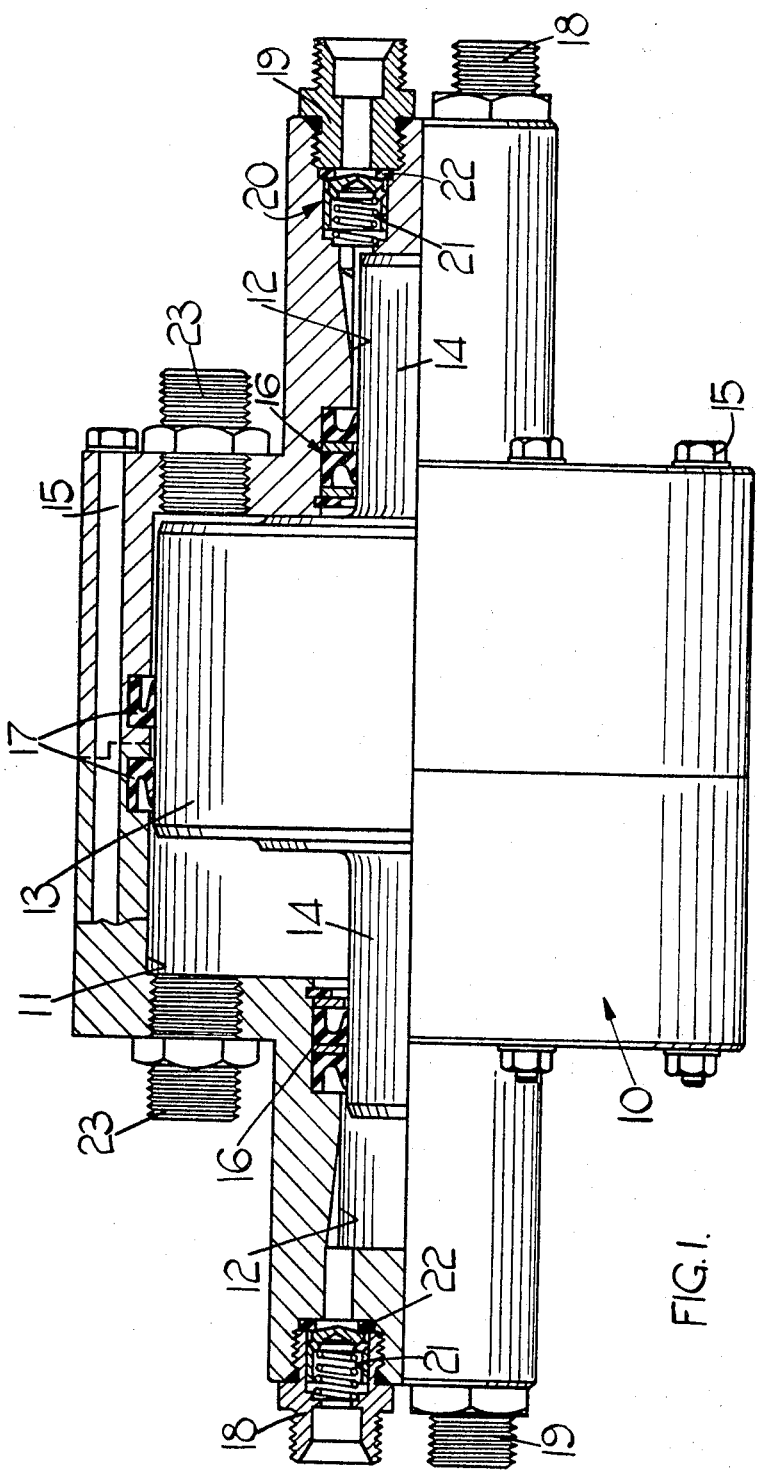
FIGURE 1 is a side elevation partly in section of one example of a fluid proportioning device in accordance with the invention.

Referring to FIGURE 1 there is provided a body part 10 in which is defined a cylindrical bore 11 (hereinafter called the main bore). At the opposite ends of the main bore is provided a pair of further coaxial cylindrical bore 12 respectively (hereinafter called the subsidiary bores). For convenience, the body part 10 is divided substantially midway between the ends of the main bore and the two parts are flanged and provided with holes for the reception of bolts 15 whereby the two parts can be secured together. Within the main bore is mounted a piston assembly having a cylindrical main piston 13 with cylindrical extensions at its opposite ends defining subsidiary pistons 15 one of which when the main piston 13 is at one extreme position, lies wholly within its subsidiary bore 12 and the other of which lies just within its subsidiary bore. The main piston 13 and the subsidiary pistons 15 are of smaller diameter than their respective bores and in order to provide sealing between the bores annular sealing members 16 are provided at the entrances of the subsidiary bores. Each sealing member comprises a pair of oppositely directed annular lip seals and furthermore, in order to divide the main bore 11 a pair of oppositely directed annular lip seals 17 are provided substantially midway between the ends of the main bore. In this manner the main bore is divided into a pair of main pumping chambers and a further pair of subsidiary pumping chambers are defined by the subsidiary bores.

Each subsidiary bore is provided with a fluid inlet 19 and a fluid outlet 18 and these are controlled by non-return valves 20 respectively, and the result is that when the piston assembly is moved in one direction fluid will be drawn into one of the subsidiary chambers and will be discharged from the other subsidiary chamber and the reverse will occur when the piston assembly is moved in the opposite direction.

Each valve 20 comprises a cylindrical cup shaped valve element 21 which is slidable within a bore communicating with the associated subsidiary bore. In the case of the outlets 18 the aforesaid bore is defined with a pipe union which constitutes the outlet whilst in the case of the inlets 19 the aforesaid bore is formed within the body. In each case the pipe union traps an annular seating member 22 against a step in the body and with which the base wall of the valve element co-operates to prevent the flow of fluid. The base wall of the valve element 21 is tapered and ports are provided at the periphery thereof, the line of contact of the base wall and the seating member being disposed inwardly of the ports.

Figure 3:
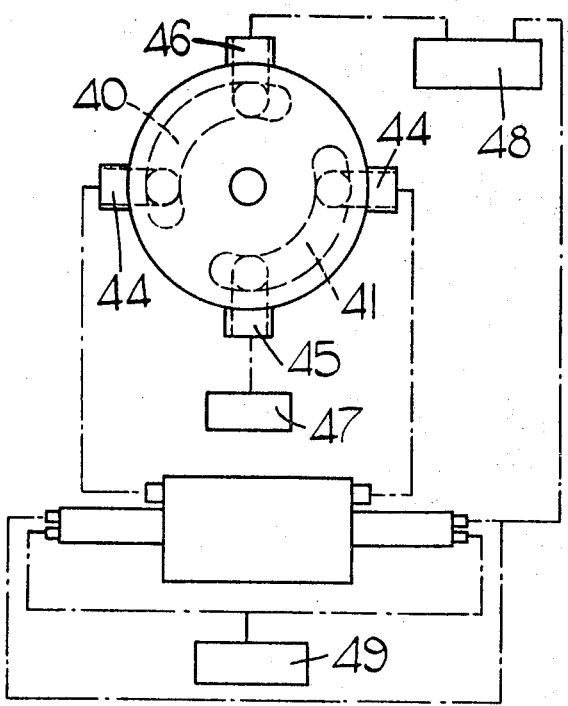
FIGURE 3 is an end elevation of the valve of FIGURE 1 together with a diagrammatic indication of the various connections with the device of FIGURE 1.
Figure 2:
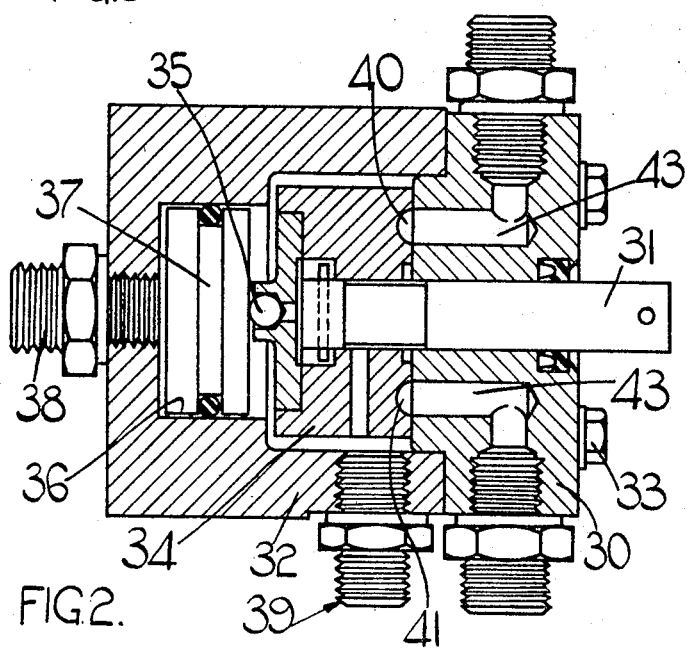
FIGURE 2 is a sectional side elevation of a valve for use with the device shown in FIGURE 1

The body is also provided with a pair of connectors 23 through which fluid can flow into and out of the main pumping chambers respectively and for control of the fluid flow into these chambers a rotary valve is provided which is shown in FIGURES 2 and 3.

The valve comprises a plate like body portion 30 in which is journalled a rotary shaft 31 which extends within a valve chamber defined in a housing 32 which is retained upon the body portion 30 by bolts 33. Surrounding the portion of the shaft within the valve chamber is a cylindrical rotary valve element 34 which is movable axially upon the shaft but which is driven by the shaft through a pin and slot connection. Moreover, the valve element 34 is provided with an insert in its end face remote from the body portion and which carries at the axis of rotation, a glass ball 35. Furthermore, the valve chamber is provided with an extension 36 of reduced diameter in which is located a piston 37 to the end of which remote from the body portion is applied a liquid pressure desired from any convenient source through an inlet 38 and this pressure creates a force acting to urge the valve element axially against the body portion. The valve element is smaller in diameter than the valve chamber and the annular space thus defined is in communication with a drain 39.

The end face of the valve element 34 which is presented to the body portion 30 is provided with a pair of arcuate spaced grooves 40, 41 each of which extend through approximately 168°. In the face of the body portion which is presented to the valve element is formed four ports 43 which are equiangularly spaced about the shaft and which are positioned to register with the grooves. A pair of diametrically opposed ports 43 are connected respectively to unions 44 secured to the body portion and in use, these are connected respectively to the connectors 23 of the proportioning device. One of the other pairs of ports 43 is connected to a connector 45 for connection in use, to a source 47 of liquid under pressure and the other port 43 is connected to a connector 46 which in the particular application is connected to a reservoir 48.

The arrangement is such that when the rotary valve is in one position liquid under pressure will be delivered to one of the main pumping chambers of the proportioning device and the piston assembly will be moved in one direction thereby. The liquid flowing from the other main pumping chamber will pass through the valve to the reservoir 48. As the valve is rotated liquid under pressure will be delivered to the other main pumping chamber and the piston assembly will be moved in the other direction, thereby displacing the liquid in the other main pumping chamber to the reservoir. In addition liquid will also be pumped in the subsidiary pumping chambers but in volumes which are determined by the effective area of the subsidiary pistons. It will be appreciated that the total volume of liquid pumped per stroke also depends upon the length of the stroke.

The arrangement described is for use in the preparation of the dialysate in a hemaodialysis machine of the kind in which the blood to be purified flows on one side of a semi-permeable membrane whilst on the other side of the membrane flows the dialysate. For such machines the dialysate is supplied in a concentrated liquid form and is diluted as required. Thus in the arrangement described the concentrated liquid is supplied to the subsidiary pumping chambers from an unpressurized source 49 and is delivered in a predetermined ratio along with the liquid (water) from the source 47, to the reservoir 48 where it is stored and processed ready for use.

Since it is essential to avoid contamination of the liquids pumped it will be observed that the seals 16 and 17 guide the movement of the piston assembly and in this manner rubbing of the piston assembly upon the bore is prevented. In order to reduce the load due to the weight of the assembly, carried by the seals it is arranged that the piston assembly is buoyant in the liquids being pumped. For this purpose the piston assembly is formed from medium to high density polyethylene.

It will be understood that further subsidiary pistons and subsidiary chambers may be provided if required, in order to obtain proportional discharge of further fluids.

Having thus described my invention what I claim as new and desire to secure by Letters Patent is:

1. A fluid mixing and proportioning device comprising in combination, a body part in which is defined a stepped bore, the central portion of the bore being larger in diameter than the end portion thereof, a complementarily shaped piston assembly slidable within said bore, sealing members disposed within the end portions of the bore respectively for co-operation with the piston assembly, a further sealing member disposed substantially mid-way between the ends of the central portion of the bore for co-operation with the piston assembly, valved inlets and outlets respectively communicating with the subsidiary chambers defined by the end portions of the bore and the end faces of the piston assembly respectively, a mixing tank, conduits connecting said valved outlets with said mixing tank, further conduits connecting said valved inlets to a source of first liquid and a valve operable to place the opposite ends of said central portion of the bore in turn in communication with a source of second fluid under pressure thereby to effect reciprocating motion of the piston, said valve also serving to direct the fluid escaping from said ends of said central portion of the bore to the mixing tank.

References Cited

UNITED STATES PATENTS

| | | | |
|---|---|---|---|
| 896,327 | 8/1908 | Roberts | 103—51 |
| 1,594,216 | 7/1926 | Smith | 103—45 |
| 2,180,795 | 11/1939 | Christensen | 230—223 XR |
| 2,592,940 | 4/1952 | Monoyer | 103—51 |
| 3,179,059 | 4/1965 | Browne et al. | 103—153 |
| 3,238,890 | 3/1966 | Sadler et al. | 103—228 XR |

ROBERT M. WALKER, *Primary Examiner.*

U.S. Cl. X.R.

103—153, 202